United States Patent
Flosbach et al.

(10) Patent No.: US 8,940,370 B2
(45) Date of Patent: Jan. 27, 2015

(54) PROCESS FOR THE PREPARATION OF THE TOP COAT LAYER OF AN AUTOMOTIVE OEM MULTI-LAYER COATING

(75) Inventors: Carmen Flosbach, Wuppertal (DE); Katharina Dreger, Dusseldorf (DE); Fabian Koehn, Wuppertal (DE); Bernd Schneider, Velbert (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 340 days.

(21) Appl. No.: 13/202,584

(22) PCT Filed: Mar. 1, 2010

(86) PCT No.: PCT/US2010/025724
§ 371 (c)(1),
(2), (4) Date: Aug. 22, 2011

(87) PCT Pub. No.: WO2010/101804
PCT Pub. Date: Sep. 10, 2010

(65) Prior Publication Data
US 2011/0305843 A1 Dec. 15, 2011

Related U.S. Application Data

(63) Continuation-in-part of application No. 12/397,877, filed on Mar. 4, 2009, now abandoned.

(51) Int. Cl.
*B05D 3/00* (2006.01)
*B05D 1/00* (2006.01)

(52) U.S. Cl.
USPC ..................... 427/385.5; 427/372.2

(58) Field of Classification Search
USPC ....................................... 427/385.5
See application file for complete search history.

(56) References Cited

U.S. PATENT DOCUMENTS

| | | | |
|---|---|---|---|
| 4,252,923 A * | 2/1981 | Konig et al. | 425/452 |
| 6,258,874 B1 * | 7/2001 | Duecoffre et al. | 523/414 |
| 6,410,147 B1 | 6/2002 | Chung et al. | |
| 7,034,067 B1 | 4/2006 | Klinksiek et al. | |
| 2002/0165334 A1 | 11/2002 | Melchiors et al. | |
| 2003/0023114 A1 | 1/2003 | Henkelmann et al. | |
| 2003/0124264 A1 * | 7/2003 | Holfter et al. | 427/421 |
| 2006/0155021 A1 | 7/2006 | Lenges et al. | |
| 2009/0018254 A1 | 1/2009 | Huster et al. | |
| 2009/0035471 A1 | 2/2009 | Flosbach et al. | |

FOREIGN PATENT DOCUMENTS

| | | |
|---|---|---|
| EP | 0626401 A1 | 11/1994 |
| WO | 2009051962 A1 | 4/2009 |

OTHER PUBLICATIONS

ISA Korean Intellectual Property Office, International Search Report and Written Opinion for International Application No. PCT/US2010/025724, mailed Oct. 13, 2010.
ISA Korean Intellectual Property Office, International Preliminary Report on Patentability for International Application No. PCT/US2010/025724, mailed Sep. 15, 2011.
European Patent Office, Extended Search Report issued in EP Application No. 10749144.1, dated Apr. 25, 2014.

* cited by examiner

*Primary Examiner* — Dah-Wei D Yuan
*Assistant Examiner* — Diane Zhang
(74) *Attorney, Agent, or Firm* — Ingrassia Fisher & Lorenz, P.C.

(57) ABSTRACT

A coating process wherein a precoated automotive substrate is OEM top coated with an aqueous two-component polyurethane top coating composition prepared by static mixing a non-aqueous hydrophobic polyisocyanate crosslinker component and an aqueous binder component having a binder solids content comprising at least one water-dilutable hydroxyl-functional binder and 5 to 30 wt.-% of a urethane compound A with at least two terminal urethane groups (—NHC(O)OR; R=hydrocarbyl residue of a monoalcohol) and having a number-average molar mass (Mn) of from 400 to 5,000.

11 Claims, No Drawings

PROCESS FOR THE PREPARATION OF THE TOP COAT LAYER OF AN AUTOMOTIVE OEM MULTI-LAYER COATING

FIELD OF THE PRESENT INVENTION

The present invention relates to a process for the preparation of the top coat layer of an automotive OEM (original equipment manufacture) multi-layer coating making use of an aqueous two-component polyurethane top coating composition.

BACKGROUND OF THE PRESENT INVENTION

Two-component polyurethane coating compositions are coating compositions that crosslink by formation of urethane bonds as a result of the addition reaction between the hydroxyl groups of a hydroxyl-functional binder component and the free isocyanate groups of a polyisocyanate crosslinker component. The hydroxyl-functional binder component and the polyisocyanate crosslinker component are stored separately from one another before being mixed to form the two-component polyurethane coating composition.

Typically, aqueous two-component polyurethane coating compositions are prepared just prior to their application by mixing an aqueous hydroxyl-functional binder dispersion component with a non-aqueous hydrophobic polyisocyanate crosslinker component. Generally speaking, these components of aqueous two-component polyurethane coating compositions are miscible with one another only after a great deal of difficulty, thereby necessitating the use of equipment requiring a high input of energy. The completely mixed aqueous two-component polyurethane coating compositions ready for application are aqueous dispersions, wherein binders and polyisocyanate crosslinkers form one or more disperse phases in a continuous aqueous phase.

The optical quality of a top coating applied from an aqueous two-component polyurethane coating composition depends upon the degree of mixing of the components prior to application. It is generally known that greater homogeneity of such a mixture, for example a finer dispersion, corresponds to an increase in the quality of the coating with regard to properties, such as, appearance, leveling and gloss.

Typically, mixing equipment for two-component coatings present in automotive OEM coating plants, for example, static mixers such as Kenics mixers, do not routinely provide the necessary mixing quality for the application of aqueous two-component polyurethane coating compositions.

EP 0 685 544 A1 and U.S. Pat. No. 7,034,067 B1 disclose processes, operating on the principle of jet dispersion, for the preparation of aqueous two-component polyurethane coating compositions. Both components of the aqueous two-component polyurethane coating composition are pressed through fine nozzles at high pressure and depressurized, wherein the mixing process is characterized by the use of a dynamic mixer, which requires considerable input of energy during mixing. However, these processes have several disadvantages such as, for example, the use of elaborate mixing technology which requires large amounts of space, general preparation work for the jet dispersion devices, and considerable amounts of energy and maintenance in order to operate the jet dispersion devices.

Another possibility to facilitate mixing is to use a hydrophilized polyisocyanate crosslinker instead of a hydrophobic one. However, this may impair pot life and/or technological properties of the coating layer applied from the aqueous two-component polyurethane coating composition and cured, in particular, in case the coating layer is a top coat layer which is exposed to weather and environmental influences. In particular, in case of automotive coating applications with its high quality requirements it is expedient to use hydrophobic polyisocyanate crosslinkers in aqueous two-component polyurethane top coating compositions.

It is desirable to provide a process for the preparation of the top coat layer of an automotive OEM multi-layer coating from an aqueous two-component polyurethane top coating composition comprising an aqueous hydroxyl-functional binder dispersion component and a non-aqueous hydrophobic polyisocyanate crosslinker component without a need to use elaborate mixing technology such as dynamic mixers (i.e. nozzle jet dispersers) when mixing the components of the aqueous two-component polyurethane coating composition. In other words, it is desirable to provide such process making use of the simple and conventional technology of static mixers rather than the elaborate mixing technology of dynamic mixers but without compromising the optical quality of the finished top coat layer. Therefore, it is an object of the present invention to provide a process for the preparation of the top coat layer of an automotive OEM multi-layer coating making use of an aqueous two-component polyurethane top coating composition comprising an aqueous hydroxyl-functional binder dispersion component and a non-aqueous hydrophobic polyisocyanate crosslinker component, where the process permits a high level of top coat quality without the use of elaborate mixing technology such as dynamic mixers when mixing the components, such that the conventional multi-component static mixing installations present in automotive OEM coating plants may be used.

SUMMARY OF THE PRESENT INVENTION

The present invention relates to a process for the preparation of the outer top coat layer of an automotive OEM multi-layer coating comprising the steps:
(1) providing an automotive substrate to be OEM top coated.
(2) preparing an aqueous two-component polyurethane top coating composition by static mixing a non-aqueous hydrophobic polyisocyanate crosslinker component and an aqueous binder component having a binder solids content comprising at least one water-dilutable hydroxyl-functional binder (hereinafter for brevity purposes also called "aqueous binder component"),
(3) spray-applying the aqueous two-component polyurethane top coating composition on the automotive substrate to be OEM top coated and
(4) thermally curing the top coat layer applied in step (3),
wherein the binder solids content of the aqueous binder component comprises 5 to 30 wt.-% (weight-%), in particular 10 to 25 wt.-% of at least one urethane compound A with at least two terminal urethane groups (—NHC(O)OR; R=hydrocarbyl residue of a monoalcohol) and having a number-average molar mass (Mn) of from 400 to 5,000.

All statements made in the present description and the claims in relation to number-average molar masses relate to number-average molar masses determined by GPC (gel permeation chromatography, polystyrene standards, polystyrene gel as stationary phase, tetrahydrofuran as mobile phase).

DETAILED DESCRIPTION OF THE EMBODIMENTS

In step (1) of the process of the present invention an automotive substrate to be OEM top coated is provided.

In the description and the claims the term "automotive substrate to be OEM top coated" is used. It refers to an automotive substrate that lack's a top coat wherein the top coat is to be applied as an original coating as opposed to, for example, a repair top coat.

Automotive substrates to be OEM top coated include in particular precoated automotive bodies and precoated automotive body metal or plastic parts, the precoatings in each case lacking a final outer top coat layer, as explained in the preceding paragraph. Examples of automotive bodies include truck and vehicle bodies, for example, passenger car bodies and van bodies. Examples of automotive body metal or plastic parts include doors, bonnets, boot lids, hatchbacks, wings, spoilers, bumpers, collision protection strips, side trim, sills, mirror housings, door handles and hubcaps.

Depending on the type of automotive substrate, the precoating may be a single- or a multi-layer precoating which in each case still needs a final outer top coat. The precoating or, in particular, the outer layer of the precoating may be already cured or still uncured. In the latter case it will be jointly thermally cured together with the top coat applied from the aqueous two-component polyurethane top coating composition. In other words, the precoated automotive bodies are automotive bodies which have already been provided with a typical automotive OEM multi-layer coating except for the final outer top coat layer. In principle the same is true for the precoated automotive body metal or plastic parts: a possible difference is here that the precoating may comprise only one coating layer. It goes without saying that the precoatings are precoatings which are applied in the context of an automotive OEM coating process, i.e. generally in the context of an industrial automotive OEM mass production coating process.

The aqueous two-component polyurethane top coating composition spray-applied in step (3) and thermally cured in step (4) of the process of the present invention may be a clear (pigment-free) top coating composition or a pigmented top coating composition which determines the color of the finished automotive substrate.

In the description and the claims the term "finished automotive substrate" is used. It refers to an automotive substrate provided with the automotive OEM multi-layer coating which is the result of the process of the present invention, i.e. the automotive OEM multi-layer coating with the thermally cured outer top coat layer.

If the aqueous two-component polyurethane top coating composition is a clear top coating composition, it is typical that the precoating on the automotive substrate comprises an outer pigmented coating layer which determines the color of the finished automotive substrate. In automotive coating such color-determining coating layers which require an outer clear top coat are typically applied from solvent- or waterborne pigmented base coats. In case of automotive bodies or automotive body metal parts, examples of such precoatings lacking an outer clear top coat include (i) a multi-layer coating comprising an electrocoat primer layer, a primer surfacer layer and an outer base coat layer, in particular, a multi-layer coating consisting of an electrocoat primer layer, a primer surfacer layer and an outer base coat layer, (ii) a multi-layer coating comprising an electrocoat primer layer and a two-layer base coat structure consisting of an inner modified base coat layer (modified base coat layer=base coat layer applied from a modified base coat which is a mixture of an unmodified base coat and an admixture component which imparts primer surfacer properties) and an outer unmodified base coat layer, in particular, a multi-layer coating consisting of an electrocoat primer layer and a two-layer base coat structure consisting of an inner modified base coat layer and an outer unmodified base coat layer and (iii) a multi-layer coating consisting of an electrocoat primer layer and an outer base coat layer. In case of automotive body plastic parts examples of precoatings lacking an outer clear top coat include (i) a multi-layer coating comprising a plastics primer layer and an outer base coat layer, in particular, a multi-layer coating consisting of a plastics primer layer and an outer base coat layer and (ii) a single-layer coating in the form of a base coat layer.

If the aqueous two-component polyurethane top coating composition is a pigmented top coating composition which determines the color of the finished automotive substrate, it is typical that the precoating on the automotive substrate comprises at least a primer layer. In case of automotive bodies or automotive body metal parts examples of typical precoatings include (i) a multi-layer coating comprising an electrocoat primer layer, and a primer surfacer layer, in particular, a multi-layer coating consisting of an electrocoat primer layer and a primer surfacer layer and (ii) a single-layer coating in the form of an electrocoat primer layer. In case of automotive body plastic parts a plastics primer layer is a typical example of a precoating.

In step (2) of the process of the present invention an aqueous two-component polyurethane top coating composition is prepared by static mixing a non-aqueous hydrophobic polyisocyanate crosslinker component and an aqueous binder component comprising at least one water-dilutable hydroxyl-functional binder and at least one urethane compound A.

As already mentioned, the aqueous two-component polyurethane top coating composition may be a clear top coating composition or a pigmented top coating composition. Apart from water, the at least one water-dilutable binder with hydroxyl groups, the at least one urethane compound A and hydrophobic polyisocyanate crosslinker, it may comprise one or more of the following optional constituents: one or more further binders other than water-dilutable binders with hydroxyl groups, one or more further crosslinkers other than hydrophobic polyisocyanate crosslinkers, organic solvents, additives, pigments and fillers (extender pigments). In case of an aqueous two-component polyurethane clear top coating composition, transparent fillers may be contained, whereas pigments and opaque fillers are generally not contained. As the name already implies, in case of an aqueous pigmented two-component polyurethane top coating composition at least one pigment is contained.

In the description and the claims the terms "binder solids" and "crosslinker solids" pre used. They refer to the solids contribution of the coating binders (binder solids) and the solids contribution of the crosslinkers (crosslinker solids) contained in the aqueous two-component polyurethane top coating composition. Binder solids and crosslinker solids together form the resin solids of the aqueous two-component polyurethane top coating composition.

Both, the aqueous binder component and the aqueous two-component polyurethane top coating composition comprise one and the same binder solids.

The binder solids content comprises at least one water-dilutable binder with hydroxyl groups and the at least one urethane compound A. In a particular embodiment, the binder solids content consists of one or more water-dilutable binders with hydroxyl groups and one or more urethane compounds of the A type. The binder solids content has a hydroxyl number in the range of, for example, 40 to 180 mg KOH/g.

The at least one water-dilutable hydroxyl-functional binder may be present in the aqueous binder component in dissolved form. Generally and preferably however, it takes the form of an aqueous dispersion or emulsion. Water-dilutable and hydroxyl-functional binders and methods for their preparation are known to the person skilled in the art of aqueous paints and coatings. Examples include water-dilutable hydroxyl-functional polyurethane resins, (meth)acrylic copolymer resins, polyester resins but also polymer hybrids, wherein two or more of said resin types bound by covalent bonds or in the form of interpenetrating resin molecules are present. (Meth)acryl or (meth)acrylic is to be understood, both here and in the following, as acryl and/or methacryl or as acrylic and/or methacrylic. The water-dilutable hydroxyl-functional binders are oligomeric or polymeric compounds with a number-average molar mass (Mn) in the range of, for example, 500 to 100,000, preferably 1000 to 50,000. Their hydroxyl numbers are in the range of, for example, 50 to 200 mg kOH/g, in particular 60 to 160 mg KOH/g.

In order to ensure water-dilutability, i.e. water-solubility or water-dispersibility of the hydroxyl-functional binders they are modified in a suitable and conventional manner to render them hydrophilic. The hydroxyl-functional binders may be anionically and/or nonionically modified. An anionic modification may be obtained, for example, by incorporating acid groups, in particular carboxyl groups which are at least partially neutralized. A nonionic modification may be obtained, for example, by incorporating polyethylene oxide units. Alternatively, or in addition thereto, it is possible to obtain water-dilutability via external emulsifiers. It is preferred that the water-dilutable hydroxyl-functional binders contain acid groups corresponding to an acid number in the range of, for example, 10 to 50 mg KOH/g. Examples of acid groups include carboxylic acid groups, sulfonic acid groups and phosphonic acid groups. Carboxylic acid groups are preferred.

It is surprising that the presence of the at least one urethane compound A in the aqueous binder component allows for effectively supporting the static mixing carried out in step (2) of the process of the present invention and thus improving the optical quality of the finished top coat which is obtained as the result of the process of the present invention. If the process is carried out under the same conditions and with the same materials but without the at least one urethane compound A being present in the aqueous binder component, the optical quality of the finished top coat is worse. Therefore it is an essential feature of the present invention that the binder solids content of the aqueous binder component comprises 5 to 30 wt.-%, in particular 10 to 25 wt.-% of the at least one urethane compound A. Thus, in case of the particular embodiment of the present invention the binder solids content of the aqueous binder component consists of 5 to 30 wt.-% of the at least one urethane compound A and 70 to 95 wt.-% of the at least one water-dilutable hydroxyl-functional binder, in particular of 10 to 25 wt.-% of the at least one urethane compound A and 75 to 90 wt.-% of the at least one water-dilutable hydroxyl-functional binder, wherein the sum of the wt.-% of the at least one urethane compound A and of the at least one water-dilutable hydroxyl-functional binder totals 100 wt.-%.

The at least one urethane compound A has at least two terminal urethane groups —NHC(O)OR and a number-average molar mass (Mn) of 400 to 5,000, preferably of 600 to 3,000. R is the hydrocarbyl residue of a monoalcohol, in particular a hydrocarbyl residue comprising up to 12 carbon atoms. The wt.-% content of terminal urethane groups —NHC(O)OR (calculated as terminal —NHC(O)O—, molar mass=59) in the at least one urethane compound A is preferably in the range of 15 to 25 wt.-%. The terminal urethane groups —NHC(O)OR are permanently monoalcohol-blocked isocyanate groups and they do not or not essentially enter into a crosslinking reaction with the at least one water-dilutable hydroxyl-functional binder or with the hydrophobic polyisocyanate crosslinker. The term "permanently blocked" as opposed to "reversibly blocked" does not mean that the monoalcohol-blocked isocyanate groups of the urethane compound A cannot, under any circumstances, re-cleave into monoalcohol and free isocyanate groups. The term is rather directed towards a person skilled in the art of paint and coatings and it is to be understood in the present context that no such re-cleaving or practically no such re-cleaving takes place during storage, application and thermal curing of the aqueous two-component polyurethane top coating composition used in the process of the present invention.

The at least one urethane compound A is substantially free from functional groups which are capable of entering into a crosslinking reaction with the at least one water-dilutable hydroxyl-functional binder or with the hydrophobic polyisocyanate crosslinker. It is, in particular, free from isocyanate and hydroxyl groups. The term "substantially free" means that there may, for example as a result of the preparation process, be provided a very small amount of the aforementioned functional groups, wherein these functional groups as a whole make almost no contribution to the crosslinking of the aqueous two-component polyurethane top coating composition.

The at least one urethane compound A may be a compound defined by empirical and structural formula or it may be an oligomer or a polymer and display a molar mass distribution.

Preferably, the at least one urethane compound A is an addition product formed by the reaction of one or more polyisocyanates with one or more monoalcohols, preferably aliphatic or cycloaliphatic monoalcohols. The polyisocyanates which are reacted with the monoalcohols comprise two or preferably more than two free isocyanate groups corresponding to a content of free isocyanate of, for example, from 10 to 50 wt.-%.

Examples of polyisocyanates which can be used for preparing the urethane compounds A comprise aromatic diisocyanates, such as, phenylene, toluylene, xylylene, naphthylene or diphenylmethane diisocyanate. However, preferred as diisocyanates are diisocyanates with NCO groups bonded to non-aromatic carbon, i.e., aliphatic, cycloaliphatic or araliphatic diisocyanates, such as, 1,6-hexane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

Examples of the preferred polyisocyanates having more than two isocyanate groups which can be used for preparing the urethane compounds A comprise trisisocyanatononane and polyisocyanates derived from the diisocyanates, in particular, the aliphatic, cycloaliphatic or araliphatic diisocyanates statectin the preceding paragraph. Such examples include oligomers of the diisocyanates or isocyanurate, uretdione or biuret derivatives of the diisocyanates or isocyanate-functional adducts of the diisocyanates and compounds having at least three groups containing active hydrogen per molecule, in particular, polyols, polyamines and/or aminoalcohols, such as, for example, trimethylolpropane, glycerol, diethylene triamine and 1:1-adducts of dialkanolamines and cyclic carbonate. The most preferred polyisocyanates are trimerization products of 1,6-hexane diisocyanate or of isophorone diisocyanate, i.e. polyisocyanates of the 1,6-hexane diisocyanate isocyanurate and polyisocyanates of the isophorone diisocyanate isocyanurate type including 1,6-hexane diisocyanate isocyanurate and isophorone diisocyanate isocyanurate.

Examples of the preferred aliphatic or cycloaliphatic monoalcohols which can be used for preparing the urethane compounds A include those having, for example, up to 12 carbon atoms. Apart from the hydroxyl groups bonded to aliphatic or cycloaliphatic carbon, the aliphatic or cycloaliphatic monoalcohols do not comprise substituents comprising heteroatoms. The aliphatic or cycloaliphatic monoalcohols do also not comprise heterocyclic moieties. Methanol, ethanol, the isomeric propanols, the isomeric butanols, lauryl alcohol, cyclohexanol and isobornyl alcohol are examples of aliphatic or cycloaliphatic monoalcohols, just to name only a few. Cyclohexanol is most preferred.

The urethane compounds A may contain a small amount of carboxyl groups, for example, corresponding to an acid number of up to 50 mg KOH/g. If the urethane compounds A have an acid number, then it is preferably in the range of 5 to 50 mg KOH/g, particularly preferably in the range of 5 to 35 mg KOH/g. For example, a small portion of the monoalcohols can therefore be replaced by hydroxycarboxylic acids during the synthesis of the urethane compounds A from polyisocyanates and monoalcohols. Examples of hydroxycarboxylic acids that can be used include malic acid, 12-hydroxystearic acid or adducts of monoepoxides and dicarboxylic acids. It is also possible to replace a portion of the monoalcohols for dials and then to react the resulting hydroxyl groups with acid anhydrides to form acid semiesters. Examples of suitable dials include ethylene glycol, the isomeric propane dials, butane dials and pentane diols, neopentyl glycol, the isomeric hexane diols, heptane dials and octane dials. Examples of acid anhydrides that can be used include maleic anhydride, succinic anhydride, tetrahydrophthalic anhydride, hexahydrophthalic anhydride, methylhexahydrophthalic anhydride, trimellitic anhydride, pyromellitic anhydride. A further possibility to introduce acid functionality into the urethane compounds A is to prepare isocyanate- and carboxyl-functional adducts by reacting di- and/or polyisocyanate with polyhydroxycarboxylic acid such as, for example, dimethylol propionic acid, and then to react remaining free NCO groups with monoalcohol.

Particularly preferred urethane compounds A are those prepared by fully blacking trimerization products of 1,6-hexane diisocyanate or of isophorone diisocyanate with cyclohexanol, in particular, 1,6-hexane diisocyanate isocyanurate fully blocked with cyclohexanol or isophorone diisocyanate isocyanurate fully blocked with cyclohexanol.

The preparation of the urethane compounds A can be carried out using processes known to a person skilled in the art. It may, for example, be carried out in the absence or in the presence of an organic solvent (mixture) which is inert towards isocyanate groups. Generally, the addition reaction is carried out in a temperature range of, for example, 60 to 120° C. In the case of a preparation without organic solvent, at the end of the synthesis, dilution can be carried out with suitable organic solvents. By neutralizing acid groups present in the urethane compounds A and diluting with water, the urethane compounds A can be converted into the aqueous phase. There may be obtained, for example, 50 to 80 wt.-% organic solutions or 35 to 55 wt.-% aqueous dispersions of the urethane compounds A.

The urethane compounds A are generally prepared by reacting the polyisocyanates with monoalcohol in a 1:1 molar ratio between OH and NCO groups. However, it is also possible first to react the polyisocyanates with monoalcohol in an NCO:OH molar ratio of from 2:1 to 1.2:1 and then to increase the molar mass by reacting the remaining NCO groups stoichiometrically with diols and/or polyols. Furthermore, it is possible to react first the polyisocyanates with diols and/or polyols by forming an isocyanate-functional prepolymer and react then with monoalcohol as a chain stopper. The reaction for the preparation of the urethane compounds A is in any case to be carried out in such a way that the resultant urethane compounds A do not contain hydroxyl or isocyanate groups.

The at least one urethane compound A can be introduced into the aqueous binder component in 100-% form, in the form of an organic solution or in the form of an aqueous dispersion. It is preferably added as an organic solution to the at least one water-dilutable hydroxyl-functional binder which is still in the non-aqueous state. The so-formed non-aqueous mixture of the at least one water-dilutable hydroxyl-functional binder and the at least one urethane compound A may then be converted into the aqueous phase, in particular, into an aqueous dispersion.

Apart from water, the at least one water-dilutable hydroxyl-functional binder and the at least one urethane compound A, the aqueous binder component may comprise one or more of the following optional constituents: one or more further binders other than water-dilutable binders with hydroxyl groups, one or more crosslinkers other than hydrophobic polyisocyanate crosslinkers, organic solvents, additives, pigments and fillers. In case of an aqueous two-component polyurethane clear top coating composition to be applied in step (3) of the process of the present invention, the aqueous binder component may contain transparent fillers, whereas pigments and opaque fillers are generally not contained. In case of an aqueous pigmented two-component polyurethane top coating composition to be applied in step (3) of the process of the present invention, the aqueous binder component contains at least one pigment.

Examples of further binders other than water-dilutable hydroxyl-functional binders which may be contained in the aqueous binder component include binder resins without functional groups or with functional groups other than hydroxyl groups. Examples of resin types are the same as those mentioned above for the water-dilutable hydroxyl-functional binders. The further binders belong to the binder solids content and they may form up to 20 wt.-% of the binder solids content. It is however preferred that the aqueous binder component contains no further binders other than water-dilutable hydroxyl-functional binders.

Examples of crosslinkers other than hydrophobic polyisocyanate crosslinkers which may be contained in the aqueous binder component include reversibly blocked polyisocyanate crosslinkers and aminoplast resins, in particular, melamine resins. Such crosslinkers do not belong to the binder solids content but together with the hydrophobic polyisocyanate crosslinkers they form the crosslinker solids of the aqueous two-component polyurethane top coating composition. The crosslinkers other than hydrophobic polyisocyanate crosslinkers may form up to 30 wt.-% of the crosslinker solids of the aqueous two-component polyurethane top coating composition. In case the aqueous binder component contains no crosslinkers other than hydrophobic polyisocyanate crosslinkers, the crosslinker solids of the aqueous two-component polyurethane top coating composition consists of one or more hydrophobic polyisocyanate crosslinkers.

The aqueous binder component may contain organic solvents which may include water-immiscible and partially or completely water-miscible organic solvents. The organic solvents may be contained in a total amount of for example, up to 10 wt.-% in the aqueous binder component. Examples of organic solvents that may be contained in the aqueous binder component include monohydric or polyhydric alcohols, for example, propanol, butanol, hexanol: glycol ethers or esters, for example, diethylene glycol dialkylethers, dipropylene glycol dialkylethers, in each case with C1- to C6-alkyl, ethoxypropanol, butylglycol; glycols, for example, propylene glycol and oligomers thereof; glycol ether esters, for example, ethyl glycol acetate, butyl glycol acetate, 3-methoxy-n-butyl acetate, butyl diglycol acetate, methoxypropyl acetate; N-methylpyrrolidone and ketones, such as, methyl ethyl ketone, acetone, cyclohexanone; esters, such as, butyl acetate, isobutyl acetate, amyl acetate; aromatic or aliphatic hydrocarbons, for example toluene, xylene or linear or branched, aliphatic C6- to C12-hydrocarbons.

Additives may be present in the aqueous binder component in a total amount of, for example, up to 5 wt.-%. Examples include paint additives such as neutralizing agents, leveling agents, wetting agents, dyes, light stabilizers, antioxidants, rheology control agents, anti-settling agents, antifoaming agents, adhesion-promoting substances, catalysts.

Examples of fillers that may be contained in the aqueous binder component in an amount of, for example, up to 30 wt.-% include silicon dioxide, talc and kaoline.

Examples of pigments that may be contained in the aqueous binder component in an amount of, for example, up to 30 wt.-% include color- and/or special effect-imparting pigments such as carbon black, titanium dioxide, iron oxide pigments, azo pigments, perylene pigments, phthalocyanine pigments, quinacridone pigments, pyrrolopyrrole pigments, aluminum pigments and mica pigments.

The non-aqueous hydrophobic polyisocyanate crosslinker component used in step (2) for the preparation of the aqueous two-component polyurethane top coating composition contains at least one hydrophobic polyisocyanate crosslinker and it may further contain, for example, up to 40 wt.-%, in particular, above 0 to 30 wt-% of one or more organic solvents which are inert towards free isocyanate groups, for example, glycol ether esters, such as, ethyl glycol acetate, butyl glycol acetate, 3-methoxy-n-butyl acetate, butyl diglycol acetate, methoxypropyl acetate; ketones, such as, methyl ethyl ketone, cyclohexanone; esters, such as, butyl acetate, isobutyl acetate, amyl acetate; aromatic or aliphatic hydrocarbons, for example toluene, xylene or linear or branched, aliphatic C6- to C12-hydrocarbons. Thus, the at least one hydrophobic polyisocyanate crosslinker may be used as such. i.e. solvent-free, in step (2) of the process of the present invention. However, it may be advantageous to use an organic solution of the at least one hydrophobic polyisocyanate crosslinker.

Hydrophobic polyisocyanate crosslinkers as opposed to hydrophilized polyisocyanate crosslinkers are free polyisocyanates without hydrophilizing moieties like ionic groups or polyethylene oxide units. In other words, they have not deliberately been provided with hydrophilic modifications. The hydrophobic polyisocyanates have an average NCO functionality of 1.5 to 5, preferably 2 to 4, and a content of free isocyanate of, for example, from 10 to 50 wt.-%.

Examples of diisocyanates which can be used as hydrophobic polyisocyanate crosslinkers comprise aromatic diisocyanates, such as, phenylene, toluylene, xylylene, naphthylene or diphenylmethane diisocyanate. However, preferred as diisocyanates are diisocyanates with NCO groups bonded to non-aromatic carbon, i.e., aliphatic, cycloaliphatic or araliphatic diisocyanates, such as, 1,6-hexane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

Hydrophobic polyisocyanate crosslinkers with more than two isocyanate groups are preferred. Examples of polyisocyanates with more than two isocyanate groups which can be used as hydrophobic polyisocyanate crosslinkers comprise trisisocyanatononane and polyisocyanates derived from the diisocyanates, in particular, the aliphatic, cycloaliphatic or araliphatic diisocyanates stated in the preceding paragraph. Such examples comprise oligomers of the diisocyanates or isocyanurate, uretdione or biuret derivatives of the diisocyanates or isocyanate-functional adducts of the diisocyanates and compounds having at least three groups containing active hydrogen per molecule, in particular, polyols, polyamines and/or aminoalcohols, such as, for example, trimethylolpropane, glycerol, diethylene triamine and 1:1-adducts of dialkanolamines and cyclic carbonate.

Examples of particularly suitable hydrophobic polyisocyanate crosslinkers are what are known as "paint polyisocyanates" based on 1,6-hexane diisocyanate, dicyclohexylmethane diisocyanate and/or isophorone diisocyanate, such as the biuret, allophanate and/or isocyanurate derivatives thereof. Most preferred as hydrophobic polyisocyanate crosslinkers are trimerization products of 1,6-hexane diisocyanate or of isophorone diisocyanate, i.e. polyisocyanates of the 1,6-hexane diisocyanate isocyanurate and polyisocyanates of the isophorone diisocyanate isocyanurate type including 1,6-hexane diisocyanate isocyanurate and isophorone diisocyanate isocyanurate.

The aqueous binder component and the non-aqueous hydrophobic polyisocyanate crosslinker component are stored separately from one another in order to prevent a premature cross-linking reaction until step (2) of the process of the present invention is carried out.

During step (2) of the process of the present invention the non-aqueous hydrophobic polyisocyanate crosslinker component and the aqueous binder component are mixed to form the ready-to-apply aqueous two-component polyurethane top coating composition. Mixing is carried out in a specified ratio, for example, in a ratio corresponding to a 1:1 to 1:2 stoichiometry between the hydroxyl groups originating from the binder solids of the aqueous binder component and the free isocyanate groups originating from the non-aqueous hydrophobic polyisocyanate crosslinker component.

The two components are mixed together making use of a static mixer, for example, a conventional static mixer such as, in particular, a Kenics mixer. Kenics mixers are static mixers typically used for automotive OEM industrial production line coating. The static mixing allows for a continuous mixing of the two components to be mixed shortly before the aqueous two-component polyurethane top coating composition is applied during step (3) of the process of the present invention. The aqueous two-component polyurethane top coating composition leaves the static mixer generally in the form of an aqueous dispersion and it is fed to the one or more spray-application devices.

The aqueous two-component polyurethane clear top coating composition has a solids content in the range of, for example, 40 to 55 wt.-%. For the pigmented aqueous two-component polyurethane top coating compositions the range is broader, for example, 40 to 60 wt.-%. The volatile content of the aqueous two-component polyurethane top coating composition is formed by (i) water originating from the aqueous binder component, (ii) optionally present organic solvent(s) originating from the aqueous binder component and/or the non-aqueous hydrophobic polyisocyanate crosslinker component and (iii) optionally present volatile additives.

In step (3) of the process of the present invention the aqueous two-component polyurethane top coating composition is spray-applied on the automotive substrate to be OEM top coated. Spray-application is carried out by conventional spray-application devices which are generally operated with electrostatic assistance. Examples of spray-application devices which are particularly suitable are high-speed rotary atomizers.

The two component polyurethane top coating composition is spray-applied in a dry film thickness in the range of, for example, 20 to 60 μm. Then, preferably after a brief flash-off phase of, for example, 30 seconds to 10 minutes at an air temperature of 20 to 25° C. and, optionally, a predrying phase of, for example, 2 to 5 minutes at an object temperature of 50 to 100° C. the clear or pigmented top coat layer is thermally cured in step (4) of the process of the present invention. Thermal curing is preferably carried out by baking.

Thermal curing takes, for example, 20 to 30 minutes and is carried out at object temperatures in the range of, for example, 60 to 160° C. The object temperatures prevailing during thermal curing are not sufficient to cleave the monoalcohol(s) from the isocyanate groups blocked thereby of the at least one urethane compound A.

The process of the present invention is carried out in the context of an industrial automotive OEM mass production coating process, in particular, i.e. in an industrial automotive OEM painting facility.

EXAMPLES

Example 1

Preparation of Aqueous Binder Dispersion 1.1) Preparation of an Organic Solution of a Urethane Compound A:

192 pbw (parts by weight) of butyl acetate and 484 pbw of Desmodur® N 3600 from Bayer (polyisocyanate of the 1,6-hexane diisocyanate isocyanurate type) and 0.06 pbw of dibutyltin dilaurate were placed in a three-necked flask having a stirrer and thermometer and heated to 60° C. 269 pbw of cylohexanol were added in portions in such a way that a temperature of 100° C. was not exceeded. The mixture was kept at 100° C. until an NCO number of <0.1% had been achieved. The mixture was then diluted with butyl acetate to produce a solution having a solids content of 75 wt.-%.

1.2) Preparation of an Aqueous Binder Dispersion Containing the Urethane Compound A:

393 pbw of a 85 wt.-% solution of a methacrylate copolymer (composition; 22.5 wt.-% glycidyl ester of versatic acid; 11.7 wt.-% of acrylic acid; 25.2 wt.-% of styrene: 17.2 wt.-% of hydroxyethyl methacrylate; 23.4 wt.-% of isobutyl methacrylate) having an acid number of 41 mg KOH/g and a hydroxyl number of 125 mg KOH/g in ethoxypropanol were mixed with 111 pbw of the solution of the urethane compound A from Example 1.1) in a three-necked flask at 80° C. The mixture was heated to 110° C. and the solvent was removed by distillation under vacuum. The mixture was then cooled to 95° C. and 24 pbw of dimethylethanolamine were added. After homogenizing for 15 minutes, demineralized water was added to produce an aqueous binder dispersion having a solids content of 42 wt.-%.

Example 2

Preparation of a Clear Top Coat Layer 2.1) Preparation of an Aqueous Binder Component:
An aqueous binder component (clear coat base) was prepared from the following constituents:
69.0 wt-% of the aqueous binder dispersion from Example 1.2),
2.0 wt.-% of K-Flex® UD-320W from King Industries (water-soluble urethane diol oligomer)
8.0 wt.-% of Maprenal® MF 921W from Cytec (melamine resin)
0.1 wt.-% of Baysilone® Al 3466 from Borchers (wetting additive).
0.6 wt.-% of Tinuvin 292® from Ciba (HALS light stabilizer),
0.8 wt.-% of Tinuvin 1130® from Ciba (UV absorber),
3.0 wt.-% of butyl diglycol
16.5 wt.-% of demineralized water.

2.2) Preparation of a Non-Aqueous Hydrophobic Polyisocyanate Crosslinker Component:
75 pbw of Desmodur® N 3600 were dissolved in 25 pbw of butyl diglycol acetate.

2.3) Preparation and Application of an Aqueous Two-Component Polyurethane Clear Coating Composition:

Using a Kenics mixer, an aqueous two-component polyurethane clear coating composition was prepared from the aqueous binder component from Example 2.1) and the non-aqueous hydrophobic polyisocyanate crosslinker component from Example 2.2). Both components were dosed over the Kenics mixer in a mixing ratio of 4 pbw of aqueous binder component: 1 pbw of non-aqueous hydrophobic polyisocyanate crosslinker component. The aqueous two-component polyurethane clear coating composition so prepared exiting the Kenics mixer was directly fed to a high-speed rotary atomizer and spray-applied in 45 μm dry film thickness onto automotive body steel test panels provided with electrocoat primer, primer surfacer and black water-borne base coat (pre-dried). After 5 minutes flashing off at room temperature and 5 minutes predrying at 80° C. (object temperature) the clear coat was bake cured for 20 minutes at 140° C. (object temperature).

The cured clear coat layer was haze-free and showed an initial gloss (determined according to standard ISO 2813; 20° angle) of 90 units.

Comparative Example 3

Preparation of a Clear Top Coat Layer 3.1) Preparation of an Aqueous Binder Dispersion:
Example 1.2) was repeated with the difference that no solution of urethane compound A was added. An aqueous binder dispersion having a solids content of 42 wt.-% was obtained.

3.2) Example 2 was repeated with the difference that instead of the 69.0 wt.-% of the aqueous binder dispersion from Example 1.2) 69.0 wt.-% of the aqueous binder dispersion from Example 3.1) were used. The cured clear coat layer showed an initial gloss (determined according to standard ISO 2813; 20°) of 85 units and a strong haze.

What is claimed is:
1. A process for the preparation of the outer top coat layer of an automotive Original Equipment Manufacture multi-layer coating comprising the steps:
(1) providing an automotive substrate to be Original Equipment Manufacture top coated,
(2) preparing an aqueous two-component polyurethane top coating composition by static mixing a non-aqueous hydrophobic polyisocyanate crosslinker component and an aqueous binder component having a binder solids content comprising at least one water-dilutable hydroxyl-functional binder,

(3) spray-applying the aqueous two-component polyurethane top coating composition on the automotive substrate to be Original Equipment Manufacture top coated, and (4) thermally curing the top coat layer applied in step (3), wherein the binder solids content of the aqueous binder component comprises 5 to 30 wt.-% of at least one urethane compound A with at least two terminal urethane groups (—NHC(O)OR; R=hydrocarbyl residue of a monoalcohol) and having a number-average molar mass (Mn) of from 400 to 5,000, and wherein the binder solids content consists of 5 to 30 wt.-% of the at least one urethane compound A and 70 to 95 wt.-% of the at least one water-dilutable hydroxyl-functional binder, wherein the sum of the wt.-% totals 100 wt.-%.

2. The process of claim 1, wherein the aqueous two-component polyurethane top coating composition is a clear top coating composition or a pigmented top coating composition.

3. The process of claim 1, wherein the at least one urethane compound A contains 15 to 25 wt.-% of terminal urethane groups —NHC(O)OR, calculated as terminal —NHC(O)O—.

4. The process of claim 1 wherein the hydrocarbyl residue R has up to 12 carbon atoms.

5. The process of any one of claim 1, wherein R is cyclohexyl.

6. The process of claim 1, wherein the at least one urethane compound A is selected from the group consisting of trimerization products of 1,6-hexane diisocyanate fully blocked with cyclohexanol and trimerization products of isophorone diisocyanate fully blocked with cyclohexanol.

7. The process of claim 1, wherein the at least one hydrophobic polyisocyanate of the non-aqueous hydrophobic polyisocyanate crosslinker component is selected from the group consisting of trimerization products of 1,6-hexane diisocyanate and trimerization products of isophorone diisocyanate.

8. The process of claim 1, wherein the mixing is carried out in a ratio corresponding to a 1:1 to 1:2 stoichiometry between the hydroxyl groups originating from the binder solids of the aqueous binder component and the free isocyanate groups originating from the non-aqueous hydrophobic polyisocyanate crosslinker component.

9. The process of claim 1, wherein the static mixer used in step (2) is a Kenics mixer.

10. The process of claim 1, wherein the thermal curing is carried out at object temperatures of 80 to 160° C.

11. The process of claim 1 being carried out in the context of an industrial automotive Original Equipment Manufacture mass production coating process.

* * * * *